US012333978B2

(12) United States Patent
Sun et al.

(10) Patent No.: US 12,333,978 B2
(45) Date of Patent: Jun. 17, 2025

(54) METHOD FOR DRIVING DISPLAY PANEL, AND DISPLAY APPARATUS

(71) Applicants: WUHAN TIANMA MICRO-ELECTRONICS CO., LTD., Wuhan (CN); Wuhan Tianma Microelectronics Co., Ltd. Shanghai Branch, Shanghai (CN)

(72) Inventors: Chenguang Sun, Wuhan (CN); Xingyao Zhou, Wuhan (CN); Yana Gao, Wuhan (CN); Shuai Yang, Wuhan (CN); Mengmeng Zhang, Wuhan (CN); Jian Kuang, Wuhan (CN)

(73) Assignees: WUHAN TIANMA MICRO-ELECTRONICS CO., LTD., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/414,721

(22) Filed: Jan. 17, 2024

(65) Prior Publication Data

US 2024/0161671 A1 May 16, 2024

(30) Foreign Application Priority Data

Jun. 20, 2023 (CN) ......................... 202310738980.4

(51) Int. Cl.
*G09G 3/20* (2006.01)
*G09G 3/3233* (2016.01)
*G09G 3/3291* (2016.01)

(52) U.S. Cl.
CPC ............. *G09G 3/20* (2013.01); *G09G 3/3233* (2013.01); *G09G 3/3291* (2013.01);
(Continued)

(58) Field of Classification Search
CPC ......... G09G 2330/021; G09G 2310/08; G09G 3/3233; G09G 2300/0861;
(Continued)

(56) References Cited

U.S. PATENT DOCUMENTS 10,964,259 B1 * 3/2021 Chang .................. G09G 3/3225
11,694,621 B2 * 7/2023 Sung .................... G09G 3/2022 345/691
(Continued)

FOREIGN PATENT DOCUMENTS

CN 112837641 A 5/2021

*Primary Examiner* — Dismery Mercedes
(74) *Attorney, Agent, or Firm* — CHRISTENSEN O'CONNOR JOHNSON KINDNESS PLLC

(57) ABSTRACT

The method includes, in a low-frequency driving mode where a keeping phase is arranged between two active phases, providing a light-emitting control signal with a duty cycle of a % to a pixel circuit during the active phase; and performing first and second switches on the light-emitting control signal during the keeping phase. The first switch is performed before the second switch. Panel brightness at the first switch is higher than panel brightness at the second switch. The duty cycle of the light-emitting control signal is b % after the second switch. b>a. A total duration of active levels of the light-emitting control signal within one frame after the first switch is between a total duration of active levels of the light-emitting control signal with the duty cycle of a % and a total duration of active levels of the light-emitting control signal with the duty cycle of b % within one frame.

19 Claims, 9 Drawing Sheets

(52) U.S. Cl.
CPC ............... *G09G 2300/0426* (2013.01); *G09G 2300/0842* (2013.01); *G09G 2300/0861* (2013.01); *G09G 2310/08* (2013.01); *G09G 2320/0233* (2013.01); *G09G 2320/0247* (2013.01); *G09G 2320/064* (2013.01); *G09G 2330/021* (2013.01); *G09G 2360/16* (2013.01)

(58) Field of Classification Search
CPC ... G09G 2300/0842; G09G 2300/0819; G09G 2320/0233; G09G 2320/0247; G09G 2310/06; G09G 2320/0626; G09G 2320/062; G09G 2230/00; G09G 2360/16; G09G 2320/064
See application file for complete search history.

(56) References Cited

U.S. PATENT DOCUMENTS

| | | | | |
|---|---|---|---|---|
| 2015/0138258 | A1* | 5/2015 | Lee | G09G 3/3225 345/691 |
| 2020/0082768 | A1* | 3/2020 | Oh | G09G 3/3291 |
| 2024/0105119 | A1* | 3/2024 | Liu | G09G 3/3233 |

* cited by examiner

METHOD FOR DRIVING DISPLAY PANEL, AND DISPLAY APPARATUS

CROSS-REFERENCE TO RELATED APPLICATIONS

The present application claims priority to Chinese Patent Application No. 202310738980.4, filed on Jun. 20, 2023, the content of which is incorporated herein by reference in its entirety.

TECHNICAL FIELD

The present disclosure relates to the field of display technologies, and in particular, to a method for driving a display panel, and a display apparatus.

BACKGROUND

In an Always On Display (AOD) mode, a display panel is typically refreshed at a relatively low data refresh frequency to reduce power consumption. In this case, a data refresh cycle of the display panel includes an active phase and a keeping phase. A driver transistor in a pixel circuit only writes a data voltage during the active phase, while not writing new data voltage during the keeping phase. However, during the keeping phase, a potential at a gate of the driver transistor may change due to current leakage, which can gradually decrease the brightness of the display panel and result in noticeable flickering on the display panel.

SUMMARY

In view of the above, embodiments of the present disclosure provide a method for driving a display panel, and a display apparatus.

According to one aspect, some embodiments of the present disclosure provide a method for driving a display panel. The display panel has a low-frequency driving mode where a keeping phase is arranged between two active phases. The method includes: in the low-frequency driving mode, providing a light-emitting control signal with a duty cycle of a % to a pixel circuit during one of the two active phases, the duty cycle representing a proportion of a width of an active level to a pulse width in the light-emitting control signal; and performing at least one first switch and a second switch on the light-emitting control signal during the keeping phase. The at least one first switch is performed before the second switch. Panel brightness when one of the at least one first switch is performed is higher than panel brightness when the second switch is performed. The duty cycle of the light-emitting control signal is b % after the second switch is performed, where b>a. A total duration of at least one active level of the light-emitting control signal within one frame period after one of the at least one first switch is performed is between a total duration of at least one active level of the light-emitting control signal with the duty cycle of a % within one frame period and a total duration of at least one active level of the light-emitting control signal with the duty cycle of b % within one frame period.

According to another aspect, some embodiments of the present disclosure provide a display apparatus applied to the foregoing method. The display apparatus includes a display panel and a driving structure. The display panel has a low-frequency driving mode where a keeping phase is arranged between two active phases. The driving structure is configured to: in the low-frequency driving mode, provide a light-emitting control signal with a duty cycle of a % to a pixel circuit during one of the two active phases, the duty cycle representing a proportion of a width of an active level to a pulse width in the light-emitting control signal; and perform at least one first switch and a second switch on the light-emitting control signal during the keeping phase. The at least one first switch is performed before the second switch. Panel brightness when one of the at least one first switch is performed is higher than panel brightness when the second switch is performed. The duty cycle of the light-emitting control signal is b % after the second switch is performed, where b>a. A total duration of at least one active level of the light-emitting control signal within one frame period after one of the at least one first switch is performed is between a total duration of at least one active level of the light-emitting control signal with the duty cycle of a % within one frame period and a total duration of at least one active level of the light-emitting control signal with the duty cycle of b % within one frame period.

BRIEF DESCRIPTION OF DRAWINGS

To describe the technical solutions in the embodiments of the present disclosure more clearly, the following briefly describes the accompanying drawings to be used in the embodiments. The accompanying drawings in the following description show merely some embodiments of the present disclosure, and a person of ordinary skill in the art may still derive other drawings from these accompanying drawings.

DESCRIPTION OF EMBODIMENTS

In order to better understand the technical solutions of the present disclosure, embodiments of the present disclosure are described in detail below with reference to the accompanying drawings.

The embodiments in the following descriptions are only some rather than all of the embodiments in the present disclosure. All other embodiments obtained by a person of ordinary skill in the art on the basis of the embodiments of the present disclosure shall fall within the protection scope of the present disclosure.

Terms used in the embodiments of the present disclosure are only for the purpose of describing specific embodiments, and are not intended to limit the present disclosure. Unless otherwise specified in the context, words, such as "a", "the", and "this", in a singular form in the embodiments of the present disclosure and the appended claims include plural forms.

The term "and/or" in this specification merely describes associations between associated objects, and it indicates three types of relationships. For example, A and/or B may indicate that A alone, A and B, or B alone. The character "/" in this specification generally indicates that the associated objects are in an "or" relationship.

As described in the background, low-frequency flickering occurs in the display panels. To solve the problem, in the related art, a duty cycle of a light-emitting control signal can be adjusted when the panel brightness attenuates to a threshold brightness, so as to longer the duration of light emission and increase the brightness.

Figure 1:
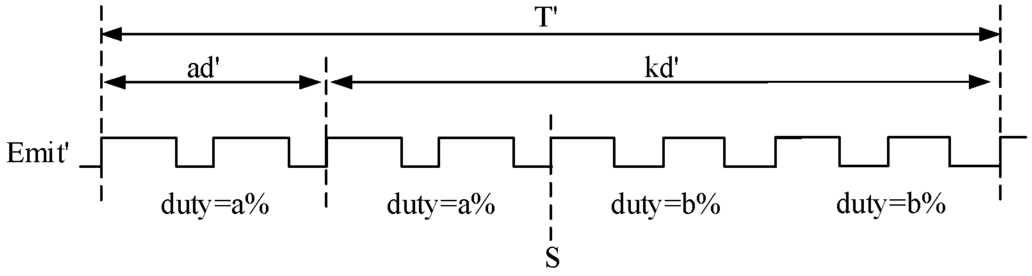
FIG. 1 is a timing sequence of a light-emitting control signal in the related art.
Figure 2:
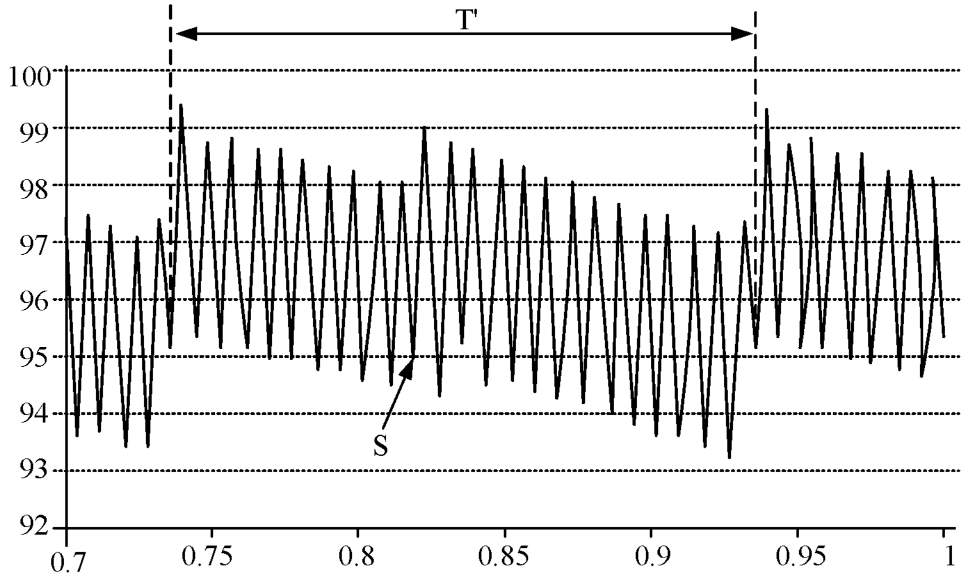
FIG. 2 is a schematic diagram of brightness variation over time in the related art.

FIG. 1 is a timing sequence of a light-emitting control signal in the related art. FIG. 2 is a schematic diagram of brightness variation over time in the related art. For example, as shown in FIG. 1 and FIG. 2, during an active phase ad' of a data refresh cycle T', a light-emitting control signal Emit' with a duty cycle of a % is provided to a pixel circuit. During a keeping phase kd', the panel brightness gradually attenuates due to current leakage. When the panel brightness attenuates to a threshold brightness, switch S can be performed on the light-emitting control signal Emit', to adjust the duty cycle of the light-emitting control signal Emit' to b %. Such adjustment increases the pulse width of the active level (e.g., low level) in the light-emitting control signal Emit', counteracting the negative impact on brightness caused by the leakage current by utilizing the positive effect of the light emission time on the brightness. The moment corresponding to "S" indicated in FIG. 2 can be considered as the moment when the switch S is performed on the light-emitting control signal Emit' in FIG. 1. With reference to FIG. 2, it can be observed that in the brightness attenuation process during the entire data refresh cycle T', after the switch S is performed on the light-emitting control signal Emit', the brightness is increased due to the increased duty cycle of the light-emitting control signal Emit'. However, FIG. 2 is only intended to illustrate a trend in the change of brightness before and after the switch S is performed. The duration of the data refresh cycle T' and the time point when the switch S is performed shown in FIG. 2 do not precisely correspond to FIG. 1.

Depending on the circuit structure of the driver circuit configured to output the light-emitting control signal Emit', when the duty cycle of the light-emitting control signal Emit' changes, the variation in the pulse width of the active level can be a multiple of four line times (H), such as 4H or 8H.

For display products such as smartphones and computers with a larger quantity of pixel rows, the line time is shorter. Therefore, when the duty cycle of the light-emitting control signal Emit' is adjusted to change the pulse width of the active level by 4 H (or 8 H, etc.), the increase in brightness will not be significant, which can increase the panel brightness to an initial brightness without causing noticeable brightness fluctuations to be visible to human eyes.

However, for display products with fewer pixel rows, such as watches, the line time is longer. Therefore, when the pulse width of the active level in the light-emitting control signal Emit' also varies by 4 H (or 8 H, etc.), the light-emitting time increases significantly. Consequently, after the duty cycle of the light-emitting control signal Emit' is adjusted, the panel brightness will be increased greatly. The brightness fluctuations caused by the brightness increase may exceed a critical brightness change of flickering that can be visible by the human eyes, which causes serious flickering.

Figure 3:
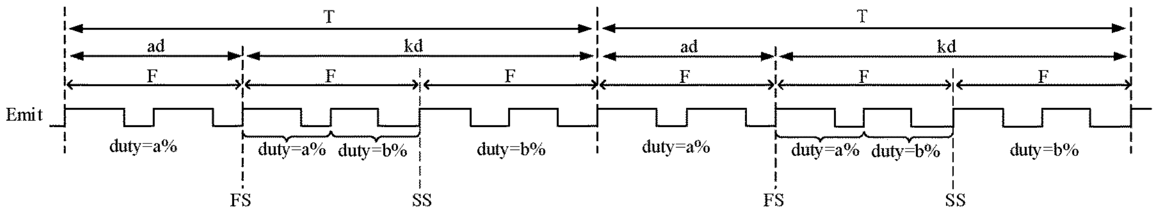
FIG. 3 is a timing sequence of a light-emitting control signal according to some embodiments of the present disclosure.
Figure 4:
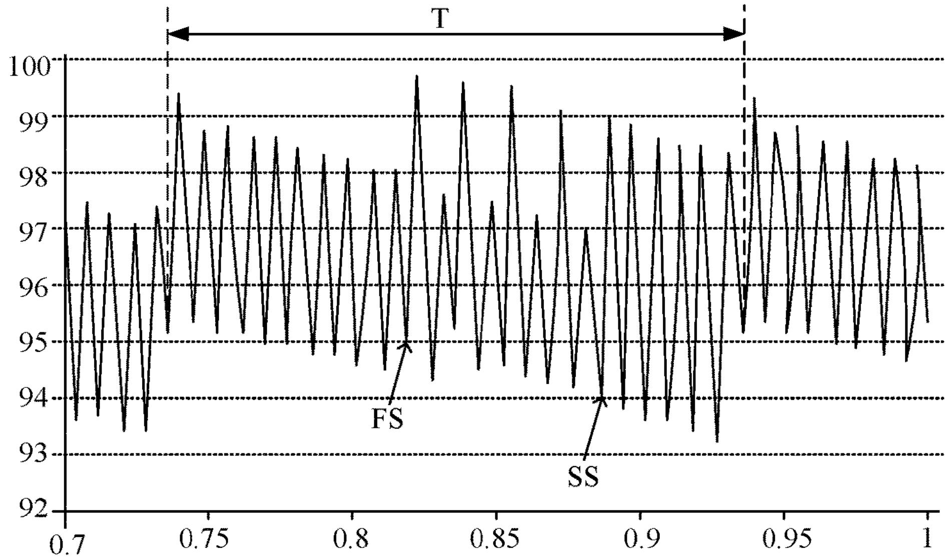
FIG. 4 is a schematic diagram of brightness variation over time according to some embodiments of the present disclosure.

In this regard, some embodiments of the present disclosure provide a method for driving a display panel. FIG. 3 is a timing sequence of a light-emitting control signal Emit according to some embodiments of the present disclosure. FIG. 4 is a schematic diagram of brightness variation over time according to some embodiments of the present disclosure. As shown in FIG. 3 and FIG. 4, the display panel has a low-frequency driving mode, in which a keeping phase kd is arranged between two active phases ad. In the low-frequency driving mode, a data refresh cycle T includes of one active phase ad and one keeping phase kd. The active phase ad includes one frame, and the keeping phase kd includes at least one frame. The frame in the active phase ad can be defined as an active frame, while the frame in the keeping phase kd can be defined as a keeping frame.

The method provided in the embodiments of the present disclosure includes the following steps: in the low-frequency driving mode, providing a light-emitting control signal Emit with a duty cycle of a % to a pixel circuit during the active phase ad, and performing at least one first switch FS and a second switch SS on the light-emitting control signal Emit during the keeping phase kd. The duty cycle represents a proportion of a width of an active level to a pulse width in the light-emitting control signal Emit.

The first switch FS is performed before the second switch SS, and panel brightness when the first switch FS is performed is higher than panel brightness when the second switch SS is performed. After the second switch SS is performed, the duty cycle of the light-emitting control signal Emit is b %, where $b>a$. A total duration of at least one active level of the light-emitting control signal Emit within one frame period F after the first switch is performed is between a total duration of at least one active level of the light-emitting control signal Emit with the duty cycle of a % within one frame F period and a total duration of at least one active level of the light-emitting control signal Emit with the duty cycle of b % within one frame period F. In some embodiments of the present disclosure, the active level of the light-emitting control signal Emit being a low level is taken as an example.

In some embodiments of the present disclosure, the panel brightness when the second switch SS is performed on the light-emitting control signal Emit may be the aforementioned threshold brightness. In other words, the second switch SS can be regarded as a switch performed on the light-emitting control signal Emit when the panel brightness attenuates to the threshold brightness in the related art. Since the panel brightness when the first switch FS is performed is higher than the panel brightness when the second switch SS is performed, it can be regarded as that in this embodiment of the present disclosure, the first switch FS is firstly performed on the light-emitting control signal Emit when the panel brightness has not attenuated to the threshold brightness. After the first switch FS is performed and the increased panel brightness attenuates to the threshold brightness again, the second switch SS is then performed on the light-emitting control signal Emit.

In the embodiments of the present disclosure, during designing of the light-emitting control signal Emit after the first switch FS, the total duration of the active level within one frame period F is set between the total duration of the active level of the light-emitting control signal Emit with the duty cycle of a % and the total duration of the active level of the light-emitting control signal Emit with the duty cycle of b % within one frame period F, which can lead to only a small variation in the total duration of the active level, and then slightly increase the panel brightness. Taking the light-emitting control signal Emit within one frame period F including two pulses as an example, it is assumed that the variation in the pulse width of the active level in the pulse with a duty cycle of b % is 4 H compared to the pulse with a duty cycle of a %. In one configuration, as shown in FIG. 3, the duty cycles of the two pulses after the first switch FS is performed can be designed as a % and b % respectively. Such configuration ensures the total duration of the active level of the light-emitting control signal Emit within one frame period F after the first switch FS is performed. In this case, the pulse width of the active level of one of the two pulses does not change, while the pulse width of the active level of the other one of the two pulses has a variation of 4H, such that an average variation in the pulse widths of the active levels in the two pulses is only 2H. As a result, a slight and precise adjustment can be made to panel brightness. Since the attenuation of panel brightness when the first switch FS is performed is also small, this slight and precise brightness adjustment can precisely increase the panel brightness to its initial brightness without overcompensation.

Since the human eyes works as an integration system and the flickering visible to the human eyes is a difference in brightness over a period. In comparison to the related art in which the panel brightness is increased only once when it attenuates to the brightness threshold, embodiments of the present disclosure perform the first switch FS, which has a smaller adjustment in the active level, on the light-emitting control signal Emit before the panel brightness has attenuated to the threshold brightness. In this way, brightness can be increased gradually and smoothly for multiple times within a data refresh cycle, resulting in a uniform adjustment of overall brightness, thus reducing the flickering caused by brightness fluctuations.

FIG. 4 is only intended to illustrate a change trend of brightness before and after the first switch FS and the second switch SS are performed. The duration of the data refresh cycle T, the time point when the first switch FS is performed, and the time point when the second switch SS is performed in FIG. 4 do not precisely correspond to FIG. 3.

Figure 5:
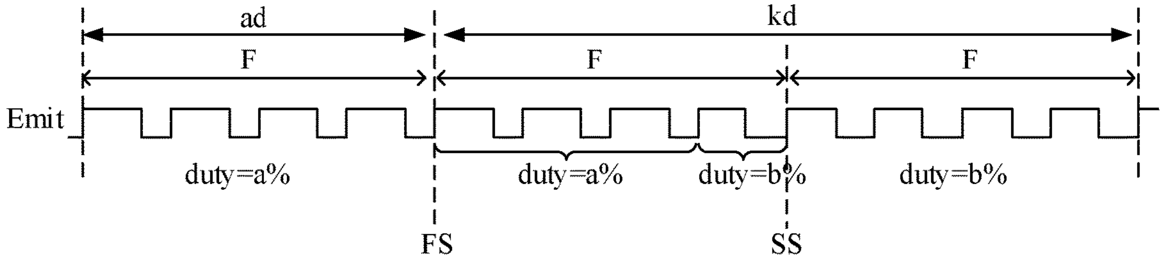
FIG. 5 is another timing sequence of a light-emitting control signal according to some embodiments of the present disclosure.

In the embodiments of the present disclosure, after the first switch FS is performed, the average variation in the pulse width of the active level in the light-emitting control signal Emit can vary depending on the design of the duty cycle of the pulse as long as the following condition is satisfied: the total duration of the active level of the light-emitting control signal Emit within one frame period F is between the total duration of the active level of the light-emitting control signal Emit with the duty cycle of a % and the total duration of the active level of the light-emitting control signal Emit with the duty cycle of b % within one frame period F. For example, it is assumed that the variation in the pulse width of the active level in the pulse with a duty cycle of b % is 4H compared to the pulse with a duty cycle of a %. FIG. 5 is another timing sequence of a light-emitting control signal Emit according to some embodiments of the present disclosure. As shown in FIG. 5, the light-emitting control signal Emit includes four pulses within one frame period F. After the first switch FS is performed, three pulses of the four pulses have a duty cycle of a %, while the remaining one pulse of the four pulses has a duty cycle of b %. In this case, the average variation in the pulse width of the active level can be only 1H.

Figure 6:
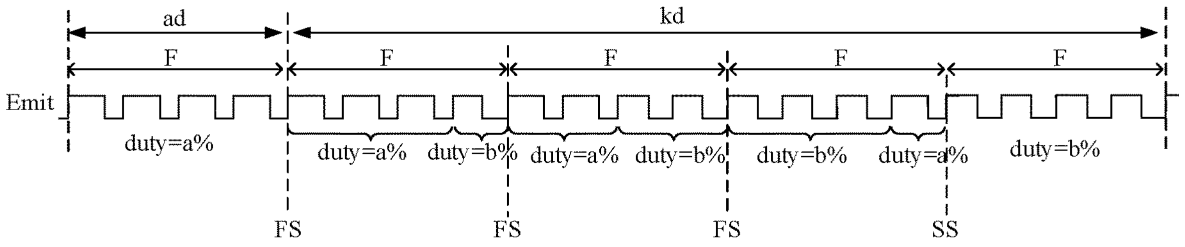
FIG. 6 is still another timing sequence of a light-emitting control signal according to some embodiments of the present disclosure.

In some embodiments, as shown in FIG. 6, which is still another timing sequence of a light-emitting control signal Emit according to some embodiments of the present disclosure, the first switch FS is performed x times, where x>1. In this case, the panel brightness after the i-th execution of the first switch FS is performed is higher than the panel brightness after the (i+1)-th execution of the first switch FS is performed. The total duration of the active level of the light-emitting control signal Emit within one frame period F after the i-th first switch FS is performed is shorter than the total duration of the active level of the light-emitting control signal Emit within one frame period F after the (i+1)-th first switch FS is performed, where i is an integer ranging from 1 to x.

Since a variation of 4% is a critical brightness change at which flickering can be visible to human eyes, in one configuration, the threshold brightness can be set to 96% of the initial panel brightness. Assuming that the first switch FS is performed three times, in one configuration, the first switch FS can be performed for the first time on the light-emitting control signal Emit when the panel brightness has attenuated to 99% of the initial panel brightness. Then, after the increased panel brightness has attenuated to 98% of the initial panel brightness, the first switch FS can be performed on the light-emitting control signal Emit for the second time. When the increased panel brightness has attenuated to 97% of the initial panel brightness, the first switch FS can be performed on the light-emitting control signal Emit for the third time.

When the first switch FS is performed on the light-emitting control signal Emit multiple times, such configuration is to perform the first switch FS multiple times while the degree of panel brightness attenuation gradually increases, which adjusts brightness smoothly and gradually. In the aforementioned configuration, compared to the (i+1)-th first switch FS, the panel brightness when the i-th first switch FS is performed is slightly higher, and the total duration of the active level of the light-emitting control signal Emit within one frame period F is slightly shorter after the i-th first switch FS is performed. In other words, the i-th first switch FS is performed when the panel brightness attenuates slightly, which only slightly increases the total duration of the active level of the light-emitting control signal Emit within one frame period F. Therefore, an increase of the brightness caused by the total duration of the active level compensates for the small attenuation amount of the panel brightness, such that the compensation amount of the light-emitting control signal Emit for the brightness matches the attenuation amount of the brightness. On the other hand, compared to the i-th first switch FS, the panel brightness is slightly lower when the (i+1)-th first switch FS is performed, and the total duration of the active level of the light-emitting control signal Emit within one frame period F is slightly longer after the (i+1)-th first switch FS is performed. In other words, the (i+1)-th first switch FS is performed when the panel brightness attenuates greatly, which increases the total duration of the active level of the light-emitting control signal Emit within one frame period F. Therefore, an increase in the brightness caused by the total duration of the active level also compensates for the large attenuation amount of the panel brightness, such that the compensation amount of the light-emitting control signal Emit for the brightness matches the attenuation amount of the brightness. In other words, in this configuration, after each first switch FS is performed, the adjustment level of the total duration of the active level of the light-emitting control signal Emit within one frame period F matches the current panel brightness attenuation degree. As a result, after each first switch FS is performed, the panel brightness can be increased to the initial brightness, improving the brightness compensation effect.

In some embodiments, to improve control effect on the brightness, when x≥3, differences between brightness when two adjacent first switches FS are performed can be equal to each other. For example, the difference between brightness when two adjacent first switches FS are performed can be 1% of the initial panel brightness.

Due to the precision of brightness detection, it is difficult to make brightness differences to be exactly equal to each other. In the embodiments of the present disclosure, different brightness differences fluctuating within a certain positive and negative range can still be considered as being equal to each other. For example, when the difference between brightness differences is within ±0.1% of the initial panel brightness, it can be considered that these different brightness differences are equal to each other.

In some embodiments, the panel brightness when the second switch SS is performed is $$\left(1 - m \times \frac{f_c}{f_r}\right) \times L,$$

and the panel brightness when the first switch FS is performed is smaller than $$\left(1 - m \times \frac{f_c}{f_r}\right) \times L.$$

Here, $f_c$, represents half of a clock frequency corresponding to the light-emitting control signal Emit, $f_r$ represents a data refresh frequency in the low-frequency driving mode, and L represents the initial panel brightness, which is the panel brightness of the display panel when the light-emitting control signal Emit with the duty cycle of a % is provided to the pixel circuit during the active phase ad.

It can be understood that a duration of the keeping phase kd in the data refresh cycle T is related to the data refresh frequency. The smaller the data refresh frequency, the longer the duration of the keeping phase kd in the data refresh cycle T, and consequently, the longer the leakage time, which has a greater impact on the brightness. In this regard, in the embodiments of the present disclosure, second brightness (threshold brightness) is designed to be related to the data refresh frequency $f_r$, to adaptively adjust the threshold brightness based on different data refresh frequencies $f_r$. For example, when the data refresh frequency $f_r$ is low, the threshold brightness can be set lower as well, such that the multiple first switch FS are performed at regular intervals before the brightness of the display panel attenuates to the threshold brightness, which smoothly adjusts brightness under ultra-low-frequency driving.

In some embodiments of the present disclosure, m can be 2. In this case, the difference between the initial panel brightness and the threshold brightness that is determined by m, $f_r$, and $f_c$, will be better matched the brightness fluctuation generated when the pulse width variation of the active level in the light-emitting control signal Emit is an integer multiple of 4 H. That is, after the second switch SS is performed, the threshold brightness can be increased to the initial brightness.

In some embodiments, when the first switch FS is performed once, the panel brightness when the first switch FS is performed is $$\left(1 - \frac{1}{2} \times m \times \frac{f_c}{f_r}\right) \times L.$$

For example, when m=2, the panel brightness when the first switch FS is performed is $$\left(1 - \frac{f_c}{f_r}\right) \times L.$$

With such conriguration, the first switch FS can be performed on the light-emitting control signal Emit when the panel brightness tends to attenuate towards a midpoint between the initial panel brightness and the threshold brightness, which lead to a more uniform overall control over the brightness.

In some embodiments, when the first switch FS is performed x times, where x≥3, the panel brightness when the i-th first switch FS is performed is $$\left(1 - n_i \times \frac{f_c}{f_r}\right) \times L,$$

where $n_i$<m, i is an integer ranging from 1 to x, $n_1<n_2< \ldots <n_x$, and $n_x-n_{x-1}=nx_{x-1}-nx_{x-2}= \ldots =n_2-n_1$.

For example, when m=2 and x=3, when the panel brightness is $$\left(1 - 0.67 \times \frac{f_c}{f_r}\right) \times L,$$

the first switch FS is performed on the light-emitting control signal Emit for the first time. When the increased panel brightness attenuates to $$\left(1-\frac{f_c}{f_r}\right)\times L,$$

the first switch is performed on the light-emitting control signal Emit for the second time. Finally, when the increased panel brightness attenuates to $$\left(1-1.33\times\frac{f_c}{f_r}\right)\times L,$$

the first switch FS is performed on the light-emitting control signal Emit for the third time. With such configuration, the first switch FS can be performed multiple times as the attenuating degree of the panel brightness are uniformly increasing, which lead to a uniform overall control over the brightness. In some embodiments, through testing and verification, it has been found that when $n_1$=0.67, $n_2$=1, and $n_3$=1.33, the difference between the initial panel brightness and the panel brightness when each first switch FS is performed is close to the brightness fluctuation generated when the pulse width variation of the active level in the light-emitting control signal Emit is an integer multiple of 4H. Therefore, after each first switch FS is performed, the panel brightness can be increased towards the initial brightness, improving the brightness compensation effect.

In some embodiments, the method includes: setting the panel brightness when the first switch FS is performed to be a first brightness, and setting the panel brightness when the second switch SS is performed to be a second brightness, the second brightness being the threshold brightness; and performing the first switch FS on the light-emitting control signal Emit in response to a first trigger instruction at a first time point, and performing the second switch SS on the light-emitting control signal Emit in response to a second trigger instruction at a second time point. The first trigger instruction includes first brightness information and first time point information, and the second trigger instruction includes second brightness information and second time point information.

Based on the above design, in the embodiments of the present disclosure, brightness testing can be performed on the display panel in the low-frequency driving mode before the display panel leaves the factory, to obtain the time points when the first switch FS and the second switch SS are performed. Taking performing the first switch FS twice on the light-emitting control signal Emit as an example, before the display panel leaves the factory, a brightness test is performed on the display panel in the low-frequency driving mode. During the active phase ad, after the light-emitting control signal Emit with the duty cycle of a % is provided to the pixel circuit, the attenuation of the panel brightness is detected. During the keeping phase kd, a time point when the panel brightness attenuates to a 1st first brightness is recorded as a $1^{st}$ first time point. For example, a frame number when the panel brightness attenuates to the $1^{st}$ first brightness during the keeping phase kd. Then, the $1^{st}$ first switch FS is performed on the light-emitting control signal Emit. The attenuation of the panel brightness is detected continuously, and a time point when the panel brightness attenuates to a $2^{nd}$ first brightness is recorded as a $2^{nd}$ nd first time point. Subsequently, the $2^{nd}$ nd first switch FS is performed on the light-emitting control signal Emit. The attenuation of the panel brightness is monitored again, and a time point when the panel brightness attenuates to the second brightness is recorded as a second time point.

In this way, after the display panel is put into use, based on the recorded time points, the corresponding trigger instructions can be directly sent out when the time points arrive, to control the corresponding switch to be performed on the light-emitting control signal Emit without detect the panel brightness in real time to determine the brightness attenuation during the display process of the display panel, which makes adjustment method be simple.

In some embodiments, referring to FIG. 3 and FIG. 5 again, during the active phase ad, the light-emitting control signal Emit includes at least two pulses within one frame period F. During the keeping phase kd, after the first switch FS and the second switch SS are performed, the light-emitting control signal Emit includes at least two pulses within one frame period F.

With such configuration, the brightness can be finely adjusted utilizing these multiple pulses within one frame period F. For example, after the first switch FS is performed, the light-emitting control signal Emit includes multiple pulses within one frame period F. By designing the duty cycles of these pulses to be different, the total duration of the active level of the light-emitting control signal Emit within one frame period F can be adjusted to different extents, thereby achieving more flexible and precise control over the brightness.

Figure 7:
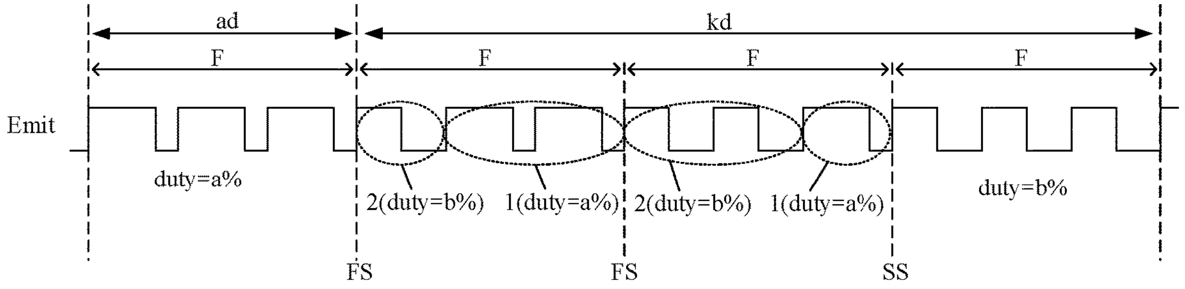
FIG. 7 is further another timing sequence of a light-emitting control signal according to some embodiments of the present disclosure.

When the light-emitting control signal Emit after the first switch FS is performed includes at least two pulses within one frame period F, in one configuration, as shown in FIG. 7, which is another timing sequence of a light-emitting control signal Emit according to some embodiments of the present disclosure, the light-emitting control signal Emit after the first switch FS is performed includes a first pulse 1 and a second pulse 2 within one frame period F. A duty cycle of the second pulse 2 is greater than a duty cycle of the first pulse 1.

In the embodiments of the present disclosure, by ensuring that the light-emitting control signal Emit after the first switch FS is performed includes at least two pulses with different duty cycles within one frame period F, the total duration of the active level of the light-emitting control signal Emit within one frame period F can be adjusted to different extents by adjusting a quantity of the two types of pulses. For example, when there are three pulses within one frame period F, two of the three pulses can be designed as the first pulse 1, or one of the three pulses can be designed as the first pulse 1. The total duration of the active level of the light-emitting control signal Emit within one frame period F will be different in these cases. In this way, the increase degree of the panel brightness after the first switch FS is performed can be flexibly adjusted, and the increased brightness is closer to the initial brightness of the panel.

In some embodiments, referring to FIG. 7 again, the duty cycle of the first pulse 1 is a %, and the duty cycle of the second pulse 2 is b %. In this way, during the entire driving process, the design of the pulse duty cycle of the light-emitting control signal Emit only includes two options: a % and b %, therefore reducing the design complexity.

Figure 8:
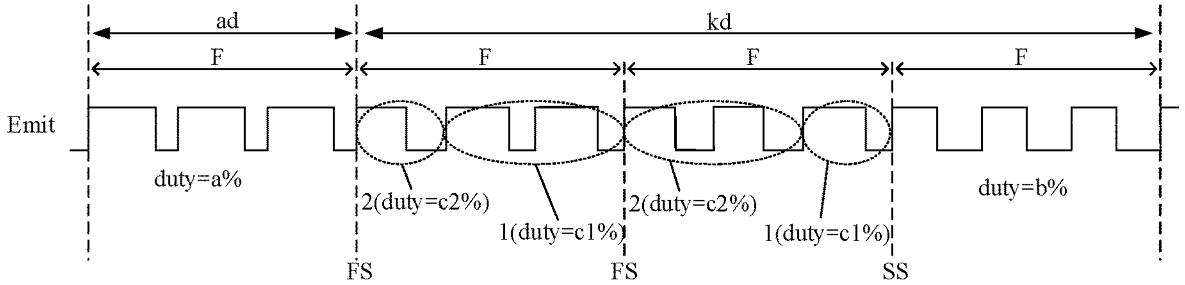
FIG. 8 is further another timing sequence of a light-emitting control signal according to some embodiments of the present disclosure.
Figure 9:
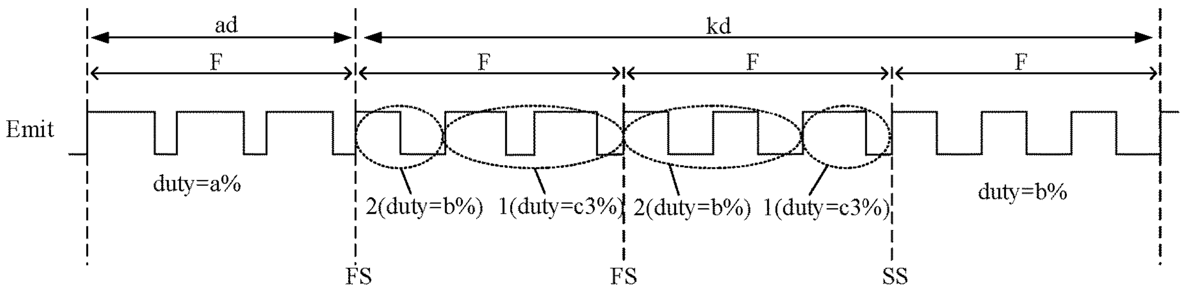
FIG. 9 is further another timing sequence of a light-emitting control signal according to some embodiments of the present disclosure.

In some embodiments of the present disclosure, the duty cycle of at least one of the first pulse 1 and the second pulse 2 can be equal to none of a % and b %. For example, in one configuration, as shown in FIG. 8, which is another timing sequence of a light-emitting control signal Emit according to some embodiments of the present disclosure, the pulse width variation of the active level in the pulse with a duty cycle of b % is 12 H compared to the pulse with a duty cycle of a %. The duty cycle of the first pulse 1 can be designed to be c1%, and the duty cycle of the second pulse 2 can be designed to be c2%. Compared to the pulse with a duty cycle of a %, the pulse width variation of the active level in the pulse with a duty cycle of c1% is 4 H, and the pulse width variation of the active level in the pulse with a duty cycle of c2% is 8 H. In another configuration, as shown in FIG. 9, which is another timing sequence of a light-emitting control signal Emit according to some embodiments of the present disclosure, the pulse width variation of the active level in the pulse with a duty cycle of b % is 8 H compared to the pulse with a duty cycle of a %. The duty cycle of the first pulse 1 can be designed to be c3%, and the duty cycle of the second pulse 2 can be designed to be b %. Compared to the pulse with a duty cycle of a %, the pulse width variation of the active level in the pulse with a duty cycle of c3% is 4 H.

In some embodiments, referring to FIG. 7 again, since the pulse width of the active level in the second pulse 2 is larger, the second pulse 2 can be located before the first pulse 1. Therefore, after the first switch FS is performed on the light-emitting control signal Emit, the light-emitting control signal Emit after the switch will output the second pulse 2 with a higher duty cycle first, which can increase panel brightness relatively fast and can optimize the brightness increase effect.

Figure 10:
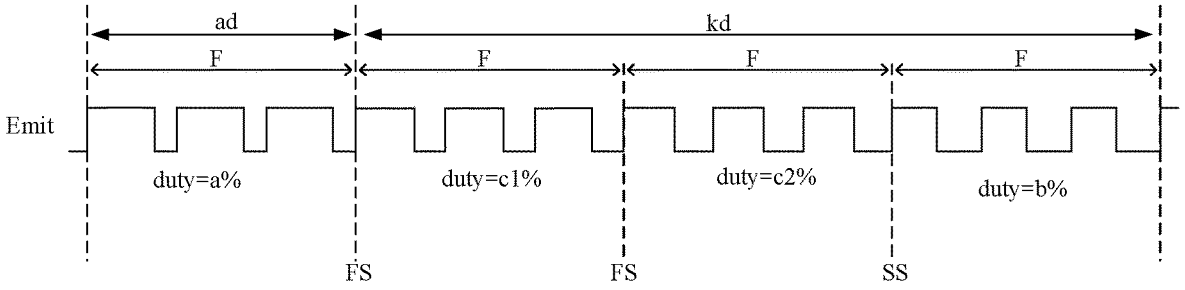
FIG. 10 is yet another timing sequence of a light-emitting control signal according to some embodiments of the present disclosure.

When the light-emitting control signal Emit after the first switch FS is performed includes at least two pulses within one frame period F, in another configuration, as shown in FIG. 10, which is yet another timing sequence of a light-emitting control signal Emit according to some embodiments of the present disclosure, the duty cycles of the at least two pulses of the light-emitting control signal Emit within one frame period F are the same after the first switch FS is performed.

For example, in one configuration, compared to the pulse with a duty cycle of a %, the pulse width variation of the active level in the pulse with a duty cycle of b % is 12 H. After the first switch FS is performed for the first time, the duty cycle of the light-emitting control signal Emit is c1%. Compared to the pulse with a duty cycle of a %, the pulse width variation of the active level in the pulse with a duty cycle of c1% is 4 H. After the first switch FS is performed for the second time, the duty cycle of the light-emitting control signal Emit is c2%. Compared to the pulse with a duty cycle of a %, the pulse width variation of the active level in the pulse with a duty cycle of c2% is 8H.

In this configuration, the duty cycles of the pulses of the light-emitting control signal Emit within one frame period F are the same after t the first switch FS is performed, making the duty cycle design simple.

In some embodiments, referring to FIG. 3 again, the light-emitting control signal Emit within one frame period F after the first switch FS is performed has a first number of pulses, and the light-emitting control signal Emit within one frame period F during the active phase ad has a second number of pulses. The first number is equal to the second number.

For example, with reference to the analysis of the panel brightness during the first switch FS as described above, in one configuration, with reference to FIG. 3, during the active phase ad, the light-emitting control signal Emit includes two pulses within one frame period F. The duty cycle of the two pulses is a %. When the panel brightness attenuates to $$\left(1-\frac{f_c}{f_r}\right)\times L,$$

the first switch FS is performed on the light-emitting control signal Emit. After the first switch FS is performed, the light-emitting control signal Emit includes two pulses within one frame period F, with one pulse having a duty cycle of a % and the other pulse having a duty cycle of b %. When the panel brightness attenuates to $$\left(1-2\times\frac{f_c}{f_r}\right)\times L,$$

the second switch SS is performed on the light-emitting control signal Emit. After the second switch SS is performed, the light-emitting control signal Emit includes two pulses within one frame period F, and the duty cycles of the two pulses is b %.

In this configuration, the number of the pulses in the light-emitting control signal Emit remains unchanged after the first switch FS is performed. The total duration of the active level within one frame period F can be adjusted to different degrees by adjusting the duty cycles of some or all of the pulses within the frame period F.

Figure 11:
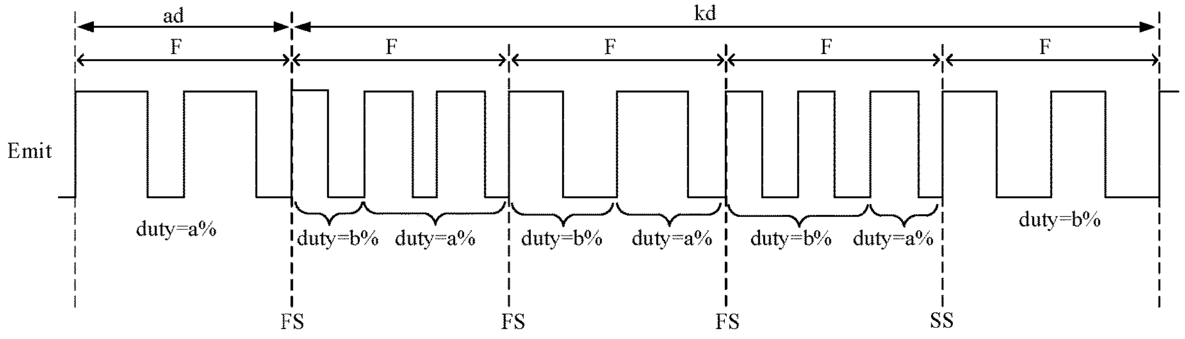
FIG. 11 is yet another timing sequence of a light-emitting control signal according to some embodiments of the present disclosure.

In some embodiments, as shown in FIG. 11, which is yet another timing sequence of a light-emitting control signal Emit according to some embodiments of the present disclosure, the light-emitting control signal Emit within one frame period F after the first switch FS is performed has a first number of pulses, and the light-emitting control signal Emit within one frame period F during the active phase ad has a second number of pulses. After at least one first switch FS is performed, the first number is greater than the second number.

For example, with reference to the analysis of the panel brightness when the first switch FS is performed as described above, in one configuration, as shown in FIG. 11, during the active phase ad, the light-emitting control signal Emit includes two pulses within one frame period F, and duty cycles of the two pulses each are a %. When the panel brightness is $$\left(1-0.67\times\frac{f_c}{f_r}\right)\times L,$$

the first switch FS is performed on the light-emitting control signal Emit for the first time. The light-emitting control signal Emit after the first switch FS is performed for the first time includes three pulses within one frame period F, with one pulse having a duty cycle of b % and the other two pulses having a duty cycle of a %. When the increased panel brightness attenuates to $$\left(1-\frac{f_c}{f_r}\right)\times L,$$

the first switch FS is performed on the light-emitting control signal Emit for the second time. The light-emitting control signal Emit after the first switch FS is performed for the second time includes two pulses within one frame period F, with one pulse having a duty cycle of b % and the other pulse having a duty cycle of a %. When the increased panel brightness attenuates to $$\left(1 - 1.33 \times \frac{f_c}{f_r}\right) \times L,$$

the first switch FS is performed on the light-emitting control signal Emit for the third time. The light-emitting control signal Emit after the first switch FS is performed for the third time includes three pulses within one frame period F, with one pulse having a duty cycle of b % and the other two pulses having a duty cycle of a %. When the increased panel brigihtness attenuates to $$\left(1 - 2 \times \frac{f_c}{f_r}\right) \times L,$$

the second switch SS is performed on the light-emitting control signal Emit. The light-emitting control signal Emit after the second switch SS is performed includes two pulses within one frame period F, with the two pulses having a duty cycle of b %.

In the embodiment of the present disclosure, the light-emitting control signal Emit has different first numbers of pulses after different first switches FS are performed. The number of pulses in the light-emitting control signal Emit within one frame period can be adjusted by adjusting the triggering frequency of the light-emitting control signal Emit.

It can be understood that as the number of pulses within one frame period F increases, the total duration of the active level within one frame period F can be finely adjusted by the variation of the pulse duty cycle. Therefore, within one frame period F, by designing the number of pulses of the light-emitting control signal Emit after at least one first switch FS is performed to be greater than the number of the pulses of the light-emitting control signal Emit provided during the active phase ad, a more precise adjustment of brightness can be achieved.

In the embodiments of the present disclosure, after the second switch SS is performed on the light-emitting control signal Emit, it is also can be determined whether a third switch, a fourth switch, and so on are subsequently performed on the light-emitting control signal Emit based on the actual brightness attenuation. For example, after the second switch SS is performed on the light-emitting control signal Emit to increase the panel brightness, the third switch can be performed on the light-emitting control signal Emit before the panel brightness has attenuated to the threshold brightness. In this case, the duty cycle of the light-emitting control signal Emit after the third switch is performed can be smaller than b %. In some embodiments, the third switch can be performed on the light-emitting control signal Emit when the panel brightness attenuates to the threshold brightness. In this case, the duty cycle of the light-emitting control signal Emit after the third switch can be b %.

Figure 12:
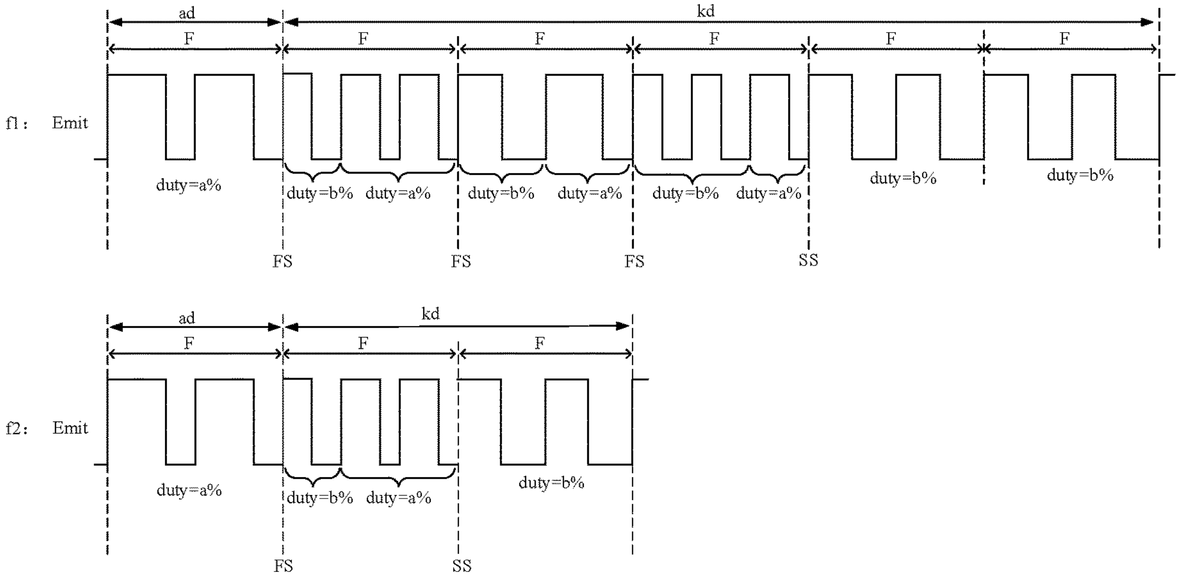
FIG. 12 is yet another timing sequence of a light-emitting control signal according to some embodiments of the present disclosure.

In some embodiments, as shown in FIG. 12, which is another timing sequence of a light-emitting control signal Emit according to some embodiments of the present embodiment, the low-frequency driving mode includes a first mode and a second mode. The first mode has a first data refresh frequency f1, and the second mode has a second data refresh frequency f2. The first data refresh frequency is lower than the second data refresh frequency f2. For example, the first data refresh frequency f1 is 15 Hz, and the second data refresh frequency f2 is 30 Hz. In some embodiments, a number of the first switches FS performed on the light-emitting control signal Emit in the first mode is greater than a number of the first switches FS performed on the light-emitting control signal Emit in the second mode.

This approach differentiates the number of performing first switches FS under different data refresh frequencies. For the first data refresh frequency f1, the first data refresh frequency f1 is relatively low and thus corresponds to a longer data refresh cycle time. Therefore, the first switch FS can be performed on the light-emitting control signal Emit for more times accordingly, which can adjust brightness at ultra-low frequencies smoothly and precisely.

Figure 13:
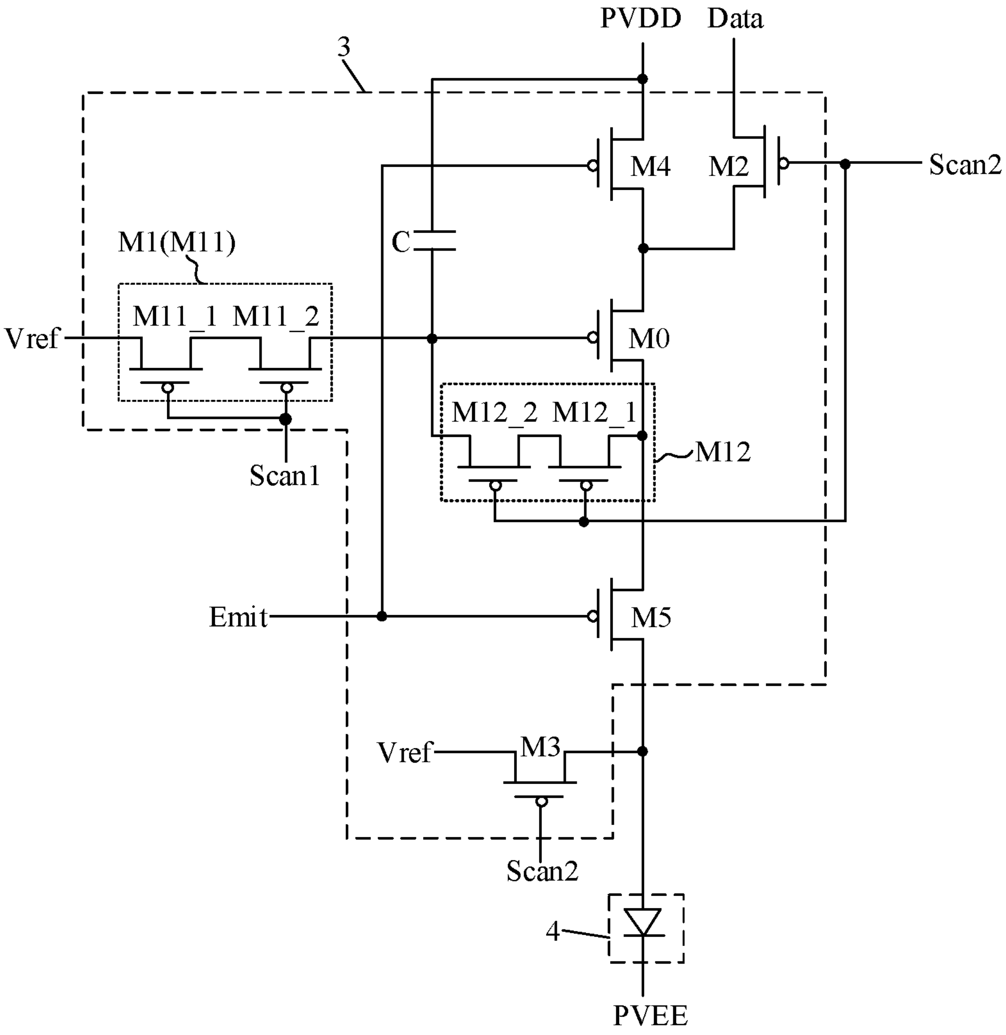
FIG. 13 is a schematic diagram of a pixel circuit according to some embodiments of the present disclosure.

In some embodiments, as shown in FIG. 13, which is a schematic diagram of a pixel circuit according to some embodiments of the present disclosure, the pixel circuit 3 includes a driver transistor M0, a first transistor M1, and a storage capacitor C. The first transistor M1 and the storage capacitor C are electrically connected to a gate of the driver transistor M0.

The method includes: determining whether $$\left(1 - e^{-\frac{1}{f_r \times Cst}}\right) \times V_{N1} \geq k \times I_{off} \times \frac{W - 2.0}{L - 3.5}$$

is satisfied; if the $$\left(1 - e^{-\frac{1}{f_r \times Cst}}\right) \times V_{N1} \geq k \times I_{off} \times \frac{W - 2.0}{L - 3.5}$$

is satisfied, performing none of the at least one first switch FS on the light-emitting control signal Emit; if $$\left(1 - e^{-\frac{1}{f_r \times Cst}}\right) \times V_{N1} \geq k \times I_{off} \times \frac{W - 2.0}{L - 3.5}$$

is not satisfied, performing the first switch FS on the light-emitting control signal Emit. $V_{N1}$ represents a voltage at the gate of the driver transistor M0 after the gate is charged during the active phase ad; k is a standard coefficient; $I_{off}$ is an off-state leakage current of the driver transistor M0; W and L represent a channel width and a channel length of the first transistor M1, respectively; Cst represents a capacitance value of the storage capacitor C; and $f_r$ represents a data refresh frequency in the low-frequency driving mode.

With reference to FIG. 13, the first transistor M1 can be a gate reset transistor M11 or a compensation transistor M12. FIG. 13 shows an example where the first transistor M1 is a gate reset transistor M11. When the first transistor M1 is the gate reset transistor M11, W and L in the equation represent a channel width and a channel length of the gate reset transistor M11, respectively. When the first transistor M1 is the compensation transistor M12, W and L in the equation represent a channel width and a channel length of the compensation transistor M12, respectively.

In one configuration, as shown in FIG. 13, the gate reset transistor M11 and the compensation transistor M12 can be dual-gate transistors. That is, the gate reset transistor M11 includes a first gate reset sub-transistor M11_1 and a second gate reset sub-transistor M11_2, while the compensation transistor M12 includes a first compensation sub-transistor M12_1 and a second compensation sub-transistor M12_2.

Figure 14:
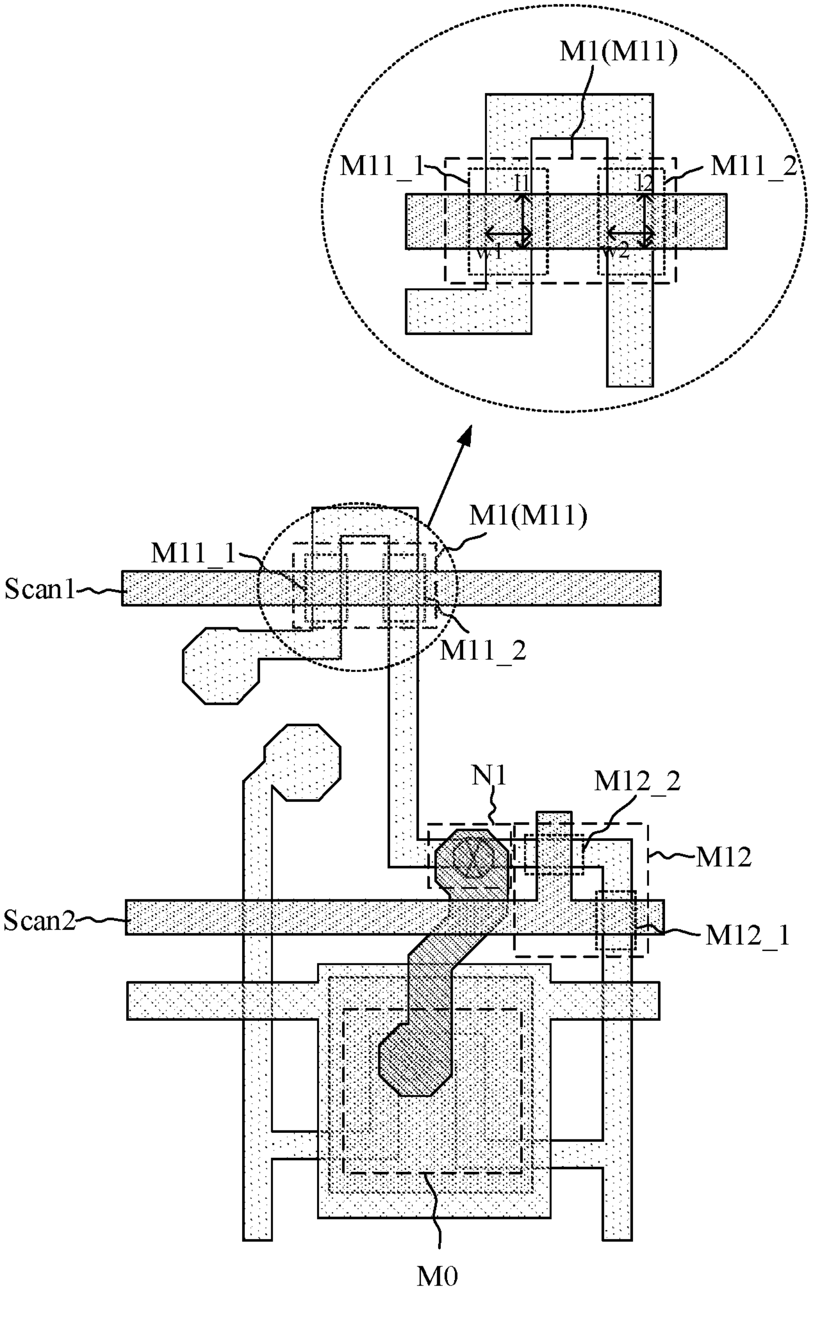
FIG. 14 is a schematic diagram of a first transistor according to some embodiments of the present disclosure.

Based on the above structure, when the first transistor M1 is the gate reset transistor M11, as shown in FIG. 14, which is a schematic diagram of the first transistor M1 according to some embodiments of the present disclosure, the channel length L of the first transistor M1 (i.e., the channel length of the gate reset transistor M11) is equal to a sum of a channel length 11 of the first sub-gate-reset transistor M11_1 and a channel length 12 of the second sub-gate-reset transistor M11_2. The channel width W of the first transistor M1 (i.e., the channel width of the gate reset transistor M11) is equal to either a channel width w1 of the first sub-gate-reset transistor M11_1 or a channel width w2 of the second sub-gate-reset transistor M11_2. The channel length w1 of the first sub-gate-reset transistor M11_1 and the channel length w2 of the second sub-gate-reset transistor M11_2 are equal. However, when the two channel lengths are not equal, the channel width W of the first transistor M1 can be the channel width of the sub-gate-reset transistor that is closer to a first node N1. The first node N1 is a connection node between the gate reset transistor M11 and the driver transistor M0. For example, referring to FIG. 14, when the second sub-gate-reset transistor M11_2 is closer to the first node N1, the channel width W of the first transistor M1 is equal to the channel width w2 of the second sub-gate-reset transistor M11_2.

Figure 15:
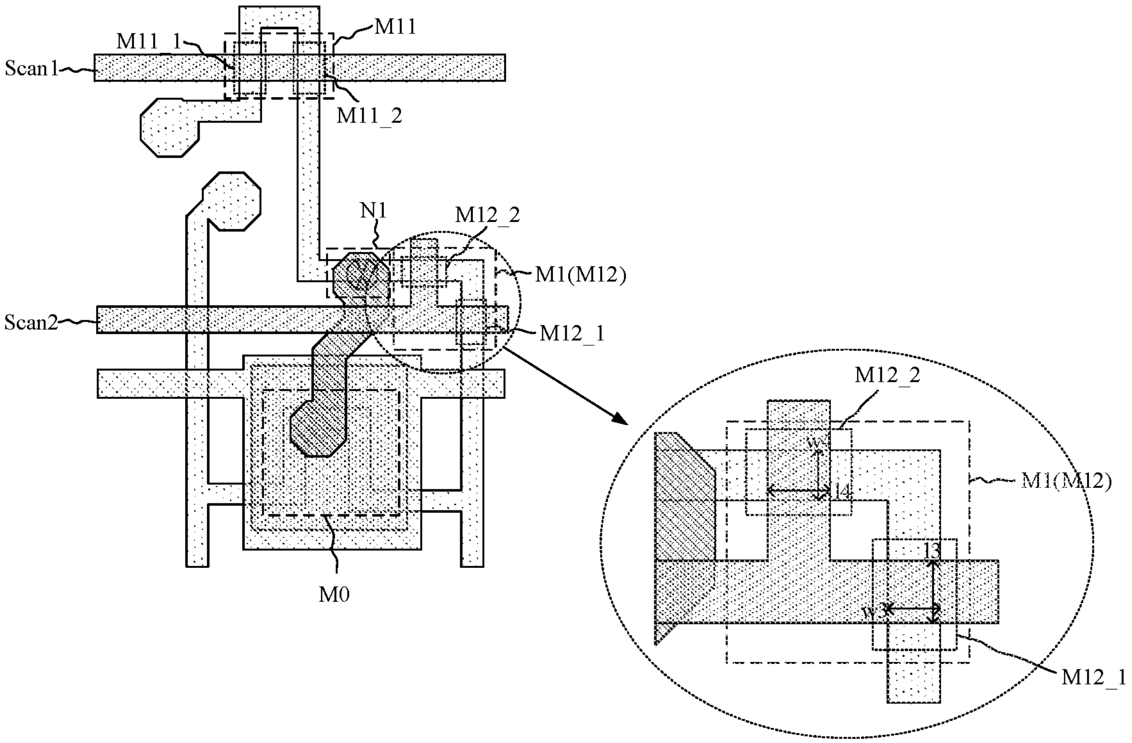
FIG. 15 is another schematic diagram of a first transistor according to some embodiments of the present disclosure.

When the first transistor M1 is a compensation transistor M12, as shown in FIG. 15, which is another schematic diagram of the first transistor M1 according to some embodiments of the present disclosure, the channel length L of the first transistor M1 (i.e., the channel length of the compensation transistor M12) is equal to a sum of a channel length 13 of the first sub-compensation transistor M12_1 and a channel length 14 of the second sub-compensation transistor M12_2. The channel width W of the first transistor M1 (i.e., the channel width of the compensation transistor M12) is equal to a channel width w3 of the first sub-compensation transistor M12_1 or a channel width w4 of the second sub-compensation transistor M12_2. The channel width w3 of the first sub-compensation transistor M12_1 and the channel width w4 of the second sub-compensation transistor M12_2 are equal. However, when the two channel widths are not equal, the channel width W of the first transistor M1 can be the channel width of the sub-compensation transistor that is closer to the first node N1. For example, referring to FIG. 15, when the second sub-compensation transistor M12_2 is closer to the first node N1, the channel width W of the first transistor M1 is equal to the channel width w4 of the second sub-compensation transistor M12_2.

The value of k can be determined by substituting given parameters under fixed brightness. The given parameters include those related to the first transistor M1, such as process parameters associated with the gate reset transistor M11 or the compensation transistor M12. When the capacitance value Cst of the storage capacitor C is in units of fF, the off-state leakage current $I_{off}$ of the driver transistor M0 is in units of A. When the voltage $V_{N1}$ on the gate of the driver transistor M0 after charging is in units of V, the magnitude of k can be in the range of 1e12. For example, the range of k can be $2\times e^{12}$ to $10\times e^{12}$. The term "fixed brightness" can be understood as a critical brightness level. When the panel brightness is lower than the fixed brightness, the impact of the leakage current on the brightness can be ignored (for example, the impact is not visible to the human eye). However, when the panel brightness reaches the fixed brightness, the leakage current has a great impact on the brightness.

It can be understood that the circuit structure of the pixel circuit influences the intensity of the leakage current of the gate of the driver transistor M0 during the keeping phase, which in turn affects the variation in the brightness. Therefore, in the embodiments of the present disclosure, the adjustment of the light-emitting control signal Emit is combined with the circuit design of the pixel circuit.

When it is determined that $$\left(1-e^{-\frac{1}{f_r\times Cst}}\right)\times V_{N1}\geq k\times I_{off}\times\frac{W-2.0}{L-3.5}$$

is satisfied, the gate of the driver transistor M0 has a high voltage after charging, indicating a low driving current converted by the driver transistor M0 and very low panel brightness. For example, the display panel can be in a very low brightness level. In this case, the brightness variation caused by the leakage current is not significant enough to be perceived by the human eye. Therefore, it is possible to skip executing the first switch FS on the light-emitting control signal Emit, so as to save power.

The above-mentioned determining process can be performed after obtaining $V_{N1}$. In the embodiments of the present disclosure, the above-mentioned determining process can be performed before the keeping phase kd. For example, the active phase ad includes a reset period, a charging period, and a light emission control period. The charging operation of the gate of the driver transistor M0 is performed during the charging period. In the embodiments of the present disclosure, the above-mentioned determining process can be performed during the light emission control period within the active phase ad, such that it is determined, before the keeping phase kd arrives, whether the first switch FS needs to be performed on the light-emitting control signal Emit, thereby avoiding missing the time point when the first switch FS is performed.

In some embodiments, when it is determined that $$\left(1-e^{-\frac{1}{f_r\times Cst}}\right)\times V_{N1}<k\times I_{off}\times\frac{W-2.0}{L-3.5},$$

the method includes: determining whether the $$k\times I_{off}\times\frac{W-2.5}{L-3.5}<\left(1-e^{-\frac{1}{f_r\times Cst}}\right)\times V_{N1}<k\times I_{off}\times\frac{W-2.0}{L-3.5}$$

is satisfied, and if $$k\times I_{off}\times\frac{W-2.5}{L-3.5}<\left(1-e^{-\frac{1}{f_r\times Cst}}\right)\times V_{N1}<k\times I_{off}\times\frac{W-2.0}{L-3.5}$$

is satisfied, when performing the first switch FS on the light-emitting control signal Emit, setting a number of pulses of the light-emitting control signal Emit within one frame period F after at least one first switch FS is performed is greater than a number of pulses of the light-emitting control signal Emit within one frame period F provided during the active phase ad; and determining whether $$\left(1 - e^{-\frac{1}{fr \times Cst}}\right) \times V_{N1} \leq k \times I_{off} \times \frac{W - 2.5}{L - 3.5}$$

is satisfied, and if $$\left(1 - e^{-\frac{1}{fr \times Cst}}\right) \times V_{N1} \leq k \times I_{off} \times \frac{W - 2.5}{L - 3.5}$$

is satisfied, when performing the first switch FS on the light-emitting control signal Emit, setting a number of pulses of the light-emitting control signal Emit within one frame period F after the first switch FS is performed is equal to a number of pulses of the light-emitting control signal Emit within one frame period F provided during the active phase ad.

When $$k \times I_{off} \times \frac{W - 2.5}{L - 3.5} < \left(1 - e^{-\frac{1}{fr \times Cst}}\right) \times V_{N1} < k \times I_{off} \times \frac{W - 2.0}{L - 3.5}$$

is satisfied, the voltage at the gate of the driver transistor M0 is slightly lower after charging, and the current converted by the driver transistor M0 is slightly higher, which reduces the impact of the leakage on the brightness and the attenuation of brightness. In this case, by increasing the number of pulses of the light-emitting control signal Emit within one frame period F after the first switch FS is performed, the brightness can be adjusted finely, and the panel brightness can be increased to the initial brightness of the panel.

When $$\left(1 - e^{-\frac{1}{fr \times Cst}}\right) \times V_{N1} \leq k \times I_{off} \times \frac{W - 2.5}{L - 3.5}$$

is satisfied, the voltage at the gate of the driver transistor M0 is lower after charging, the driving current converted by the driver transistor M0 is higher, and the leakage greatly affects the brightness. In this case, there is no need to control the brightness finely. Therefore, the number of pulses of the light-emitting control signal Emit within one frame period after the first switch FS is performed, reducing adjustment difficulty.

Referring to FIG. 13, the pixel circuit 2 can include a data writing transistor M2, an anode reset transistor M3, a first light-emitting control transistor M4, and a second light-emitting control transistor M5.

The gate reset transistor M11 includes a first gate reset sub-transistor M11_1 and a second gate reset sub-transistor M11_2. A gate of the first gate reset sub-transistor M11_1 and a gate of the second gate reset sub-transistor M11_2 are electrically connected to a first scanning signal line Scan1. A first electrode of the first gate reset sub-transistor M11_1 is electrically connected to a reset signal line Vref. A second electrode of the first gate reset sub-transistor M11_1 is connected to a first electrode of the second gate reset sub-transistor M11_2. A second electrode of the second gate reset sub-transistor M11_2 is electrically connected to the gate of the driver transistor M0.

The data writing transistor M2 has a gate electrically connected to a second scanning signal line Scan2, a first electrode electrically connected to a data line Data, and a second electrode electrically connected to a first electrode of the driver transistor M0.

The compensation transistor M12 includes a first compensation sub-transistor M12_1 and a second compensation sub-transistor M12_2. A gate of the first compensation sub-transistor M12_1 and a gate of the second compensation sub-transistor M12_2 are electrically connected to the second scanning signal line Scan2. A first electrode of the first compensation sub-transistor M12_1 is electrically connected to a second electrode of the driver transistor M0. A second electrode of the first compensation sub-transistor M12_1 is electrically connected to a first electrode of the second compensation sub-transistor M12_2. A second electrode of the second compensation sub-transistor M12_2 is connected to the gate of the driver transistor M0.

The anode reset transistor M3 has a gate electrically connected to the second scanning signal line Scan2, a first electrode electrically connected to the reset signal line Vref, and a second electrode electrically connected to an anode of a light-emitting element 4.

The first light-emitting control transistor M4 has a gate electrically connected to a light-emitting control signal line Emit, a first electrode electrically connected to a power signal line PVDD, and a second electrode electrically connected to a first electrode of the driver transistor M0.

The second light-emitting control transistor M5 has a gate electrically connected to the light-emitting control signal line Emit, a first electrode electrically connected to a second electrode of the driver transistor M0, and a second electrode electrically connected to the anode of the light-emitting element 4 and the storage capacitor C.

The working principle of the pixel circuit is the same as that in the related art, and details are not described herein again.

Figure 16:
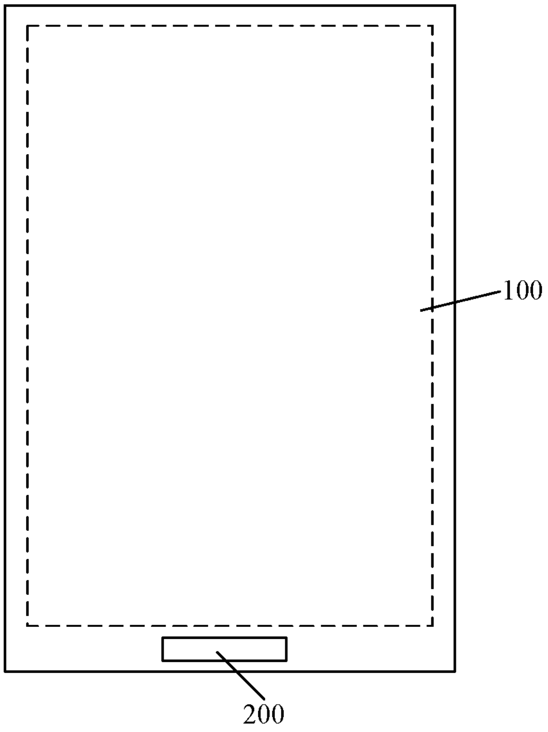
FIG. 16 is a schematic diagram of a display apparatus according to some embodiments of the present disclosure.

Some embodiments of the present disclosure provide a display apparatus applied to the foregoing method. With reference to FIG. 3, as shown in FIG. 16, which is a schematic diagram of a display apparatus according to some embodiments of the present disclosure, the display apparatus may include a display panel 100 and a driving structure 200. The driving structure 200 may include a driving chip.

The display panel 100 has a low-frequency driving mode where a keeping phase kd is arranged between two active phases ad.

The driving structure 200 is configured to: in the low-frequency driving mode, provide a light-emitting control signal Emit with a duty cycle of a % to a pixel circuit during the active phase ad and perform at least one first switch FS and a second switch SS on the light-emitting control signal Emit during the keeping phase kd. The duty cycle represents a proportion of a width of an active level to a pulse width in the light-emitting control signal Emit. The first switch FS is performed before the second switch SS, and panel brightness when the first switch FS is performed is higher than panel brightness when the second switch SS is performed. After the second switch SS is performed, the duty cycle of the light-emitting control signal Emit is b %, where b>a. A total duration of the active level of the light-emitting control signal Emit within one frame period F after the first switch FS is performed, is between a total duration of the active level of the light-emitting control signal Emit with the duty cycle of a % within one frame period and a total duration of the active level of the light-emitting control signal Emit with the duty cycle of b % within one frame period.

With reference to the foregoing analysis, the display apparatus provided by the embodiments of the present disclosure executes first switch FS, which provides a smaller adjustment in the active level, on the light-emitting control signal Emit before the panel brightness has attenuated to the threshold brightness. This allows for multiple gradual and smooth increases in brightness within a data refresh cycle, resulting in a more uniform adjustment of overall brightness, thus reducing the flickering caused by brightness fluctuations.

Figure 17:
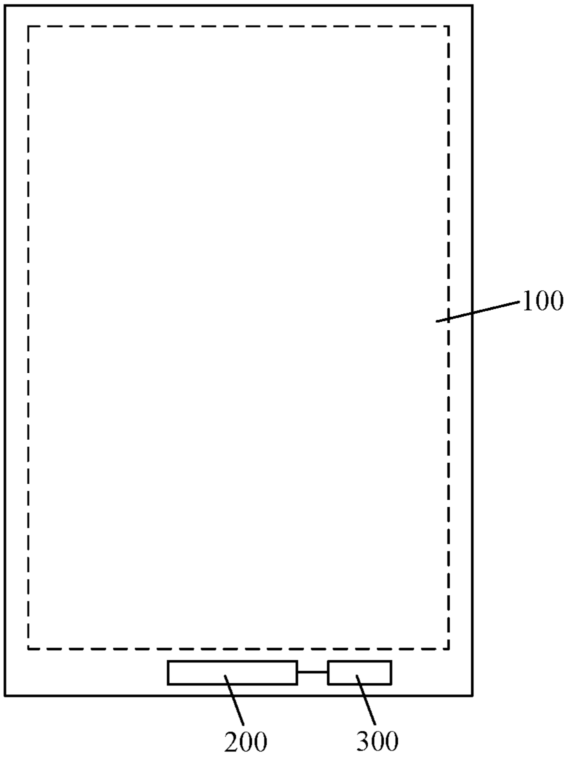
FIG. 17 is another schematic diagram of a display apparatus according to some embodiments of the present disclosure.

In some embodiments, the panel brightness when the first switch FS is performed is a first brightness, and the panel brightness when the second switch SS is performed is a second brightness. As shown in FIG. 17, which is another schematic diagram of a display apparatus according to some embodiments of the present disclosure, the display apparatus includes a trigger structure 300. The trigger structure 300 is electrically connected to the driving structure 200. The trigger structure is configured to send a first trigger instruction at a first time point to control the driving structure 200 to perform the first switch FS on the light-emitting control signal Emit, and is configured to send a second trigger instruction at a second time point to control the driving structure 200 to perform the second switch SS on the light-emitting control signal Emit. The first trigger instruction includes first brightness information and first time point information, and the second trigger instruction includes the second brightness information and the second time point information.

Based on the foregoing analysis, by setting the trigger structure 300, brightness testing can be performed on the display panel 100 before the display panel 100 leaves the factory, to determine the timing point when each of the first switch FS and the second switch SS is performed. In this way, after the display panel 100 is put into use, based on the recorded time points, the corresponding trigger instructions can be directly sent at these time points, to control the corresponding switch to be performed on the light-emitting control signal Emit without detect the panel brightness in real time to determine the brightness attenuation during the display process of the display panel, which makes adjustment method be simple.

The above description depicts examples of the present disclosure, and are not intended to limit the present disclosure. Any modifications, equivalent replacements, improvements, and the like made within the principle of the present disclosure shall fall within the scope of the present disclosure.

Finally, it should be noted that the above embodiments are merely intended to describe the technical solutions of the present disclosure, rather than to limit the present disclosure. Although the present disclosure is described in detail with reference to the above embodiments, persons of ordinary skill in the art should understand that they may still make modifications to the technical solutions described in the above embodiments or make equivalent replacements to some or all technical features thereof, without departing from the essence of the technical solutions in the embodiments of the present disclosure.

What is claimed is:

1. A method for driving a display panel, wherein the display panel has a low-frequency driving mode where a keeping phase is arranged between two active phases;

wherein the method comprises:

in the low-frequency driving mode, providing a light-emitting control signal with a duty cycle of a % to a pixel circuit during one of the two active phases, the duty cycle representing a proportion of a width of an active level to a pulse width in the light-emitting control signal; and performing at least one first switch and a second switch on the light-emitting control signal during the keeping phase, wherein the at least one first switch is performed before the second switch; panel brightness when one of the at least one first switch is performed is higher than panel brightness when the second switch is performed; the duty cycle of the light-emitting control signal is b % after the second switch is performed, where a % and b % refer to lengths of the duty cycles, a and b are positive numbers, and b>a; and a total duration of at least one active level of the light-emitting control signal within one frame period after one of the at least one first switch is performed is between a total duration of at least one active level of the light-emitting control signal with the duty cycle of a % within one frame period and a total duration of at least one active level of the light-emitting control signal with the duty cycle of b % within one frame period.

2. The method according to claim 1, wherein the at least one first switch comprises x first switches, where x>1; and panel brightness when an i-th first switch of the x first switches is performed is higher than panel brightness when an (i+1)-th first switch of the x first switches is performed, where i is a positive integer, and a total duration of at least one active level of the light-emitting control signal within one frame period after the i-th first switch is performed is shorter than a total duration of at least one active level of the light-emitting control signal within one frame period after the (i+1)-th first switch is performed.

3. The method according to claim 2, wherein x≥3, and brightness differences between panel brightness when two adjacent first switches are performed are equal to each other.

4. The method according to claim 1, wherein the panel brightness when the second switch is $$\left(1 - m \times \frac{f_c}{f_r}\right) \times L,$$

wherein $f_c$ represents half of a clock frequency corresponding to the light-emitting control signal, $f_r$ represents a data refresh frequency in the low-frequency driving mode, m is an integer, and L represents an initial panel brightness; and the panel brightness when the one of the at least one first switch is performed is smaller than $$\left(1 - m \times \frac{f_c}{f_r}\right) \times L.$$

5. The method according to claim 4, wherein the at least one first switch comprises one first switch, and the panel brightness when the one first switch is performed is $$\left(1 - \frac{1}{2} \times m \times \frac{f_c}{f_r}\right) \times L.$$

6. The method according to claim 4, wherein the at least one first switch comprises x first switches, where x≥3, and panel brightness when an i-th first switch is performed is $$\left(1 - n_i \times \frac{f_c}{f_r}\right) \times L,$$

where $n_i<m$, i is an integer ranging from 1 to x, $n_1<n_2< \ldots <n_x$, and $n_x-n_{x-1}=n_{x-1}-n_{x-2}= \ldots =n_2-n_1$.

7. The method according to claim 1, further comprising:

setting the panel brightness when the one of the at least one first switch is performed, to be a first brightness, and setting the panel brightness when the second switch is performed, to be a second brightness; and performing the one of the at least one first switch on the light-emitting control signal in response to a first trigger instruction at a first time point, and performing the second switch on the light-emitting control signal in response to a second trigger instruction at a second time point, wherein the first trigger instruction comprises first brightness information and first time point information, and the second trigger instruction comprises second brightness information and second time point information.

8. The method according to claim 1, wherein during one of the two active phases, the light-emitting control signal comprises at least two pulses within one frame period; and during the keeping phase, after each of the at least one first switch and the second switch is performed, the light-emitting control signal comprises at least two pulses within one frame period.

9. The method according to claim 8, wherein the at least two pulses of the light-emitting control signal after one of the at least one first switch is performed comprise a first pulse and a second pulse within one frame period, wherein the second pulse has a duty cycle greater than a duty cycle of the first pulse.

10. The method according to claim 9, wherein the duty cycle of the first pulse is a %, and the duty cycle of the second pulse is b %.

11. The method according to claim 9, wherein the second pulse is located before the first pulse.

12. The method according to claim 8, wherein the at least two pulses of the light-emitting control signal after one of the at least one first switch is performed have a same duty cycle.

13. The method according to claim 1, wherein the light-emitting control signal within one frame period after the one of the at least one first switch is performed has a first number of pulses, and the light-emitting control signal within one frame period during one of the two active phases has a second number of pulses; and the first number is equal to the second number.

14. The method according to claim 1, wherein the light-emitting control signal within one frame period after the one of the at least one first switch is performed has a first number of pulses, and the light-emitting control signal within one frame period during one of the two active phases has a second number of pulses; and the first number is greater than the second number.

15. The method according to claim 1, wherein the low-frequency driving mode comprises a first mode and a second mode; the first mode has a first data refresh frequency, the second mode has a second data refresh frequency, and the first data refresh frequency is lower than the second data refresh frequency; and a number of the at least one first switch that is performed on the light-emitting control signal in the first mode is greater than a number of the at least one first switch performed on the light-emitting control signal in the second mode.

16. The method according to claim 1, wherein the pixel circuit comprises a driver transistor, a first transistor, and a storage capacitor, wherein the first transistor and the storage capacitor are electrically connected to a gate of the driver transistor; and wherein the method further comprises:

determining whether $$\left(1 - e^{-\frac{1}{f_r \times Cst}}\right) \times V_{N1} \geq k \times I_{off} \times \frac{W - 2.0}{L - 3.5}$$

is satisfied;

performing none of the at least one first switch on the light-emitting control signal in response to $$\left(1 - e^{-\frac{1}{f_r \times Cst}}\right) \times V_{N1} \geq k \times I_{off} \times \frac{W - 2.0}{L - 3.5}$$

being satisfied; and performing the at least one first switch on the light-emitting control signal in response to $$\left(1 - e^{-\frac{1}{f_r \times Cst}}\right) \times V_{N1} \geq k \times I_{off} \times \frac{W - 2.0}{L - 3.5}$$

being not satisfied otherwise, where $V_{N1}$ represents a voltage at the gate of the driver transistor after the gate is charged during one of the two active phases; k represents a standard coefficient; $I_{off}$ represents an off-state leakage current of the driver transistor; W represents a channel width of the driver transistor, and L represents a channel length of the first transistor; Cst represents a capacitance value of the storage capacitor; and $f_r$ represents a data refresh frequency in the low-frequency driving mode.

17. The method according to claim 16, wherein when it is determined that $$\left(1 - e^{-\frac{1}{f_r \times Cst}}\right) \times V_{N1} < k \times I_{off} \times \frac{W - 2.0}{L - 3.5}$$

is not satisfied, the method further comprises:

determining whether $$k \times I_{off} \times \frac{W - 2.5}{L - 3.5} < \left(1 - e^{-\frac{1}{f_r \times Cst}}\right) \times V_{N1} < k \times I_{off} \times \frac{W - 2.0}{L - 3.5}$$

is satisfied; and in response to $$k \times I_{off} \times \frac{W - 2.5}{L - 3.5} < \left(1 - e^{-\frac{1}{f_r \times Cst}}\right) \times V_{N1} < k \times I_{off} \times \frac{W - 2.0}{L - 3.5}$$

being satisfied, when the one of the at least one first switch is performed on the light-emitting control signal, setting a number of pulses of the light-emitting control signal within one frame period after the one of the at least one first switch is performed to be greater than a number of pulses of the light-emitting control signal within one frame period during one of the two active phases; and determining whether $$\left(1 - e^{-\frac{1}{fr \times Cst}}\right) \times V_{N1} \leq k \times I_{off} \times \frac{W - 2.5}{L - 3.5}$$

is satisfied; and in response to $$\left(1 - e^{-\frac{1}{fr \times Cst}}\right) \times V_{N1} \leq k \times I_{off} \times \frac{W - 2.5}{L - 3.5}$$

being satisfied, when the one of the at least one first switch is performed on the light-emitting control signal, setting a number of pulses of the light-emitting control signal within one frame period after the one of the at least one first switch to be equal to a number of pulses of the light-emitting control signal within one frame period during one of the two active phases.

18. A display apparatus, comprising:

a display panel having a low-frequency driving mode where a keeping phase is arranged between two active phases; and a driving structure configured to: in the low-frequency driving mode, provide a light-emitting control signal with a duty cycle of a % to a pixel circuit during one of the two active phases, the duty cycle representing a proportion of a width of an active level to a pulse width in the light-emitting control signal; and perform at least one first switch and a second switch on the light-emitting control signal during the keeping phase, wherein the at least one first switch is performed before the second switch; panel brightness when one of the at least one first switch is performed is higher than panel brightness when the second switch is performed; the duty cycle of the light-emitting control signal is b % after the second switch is performed, where a % and b % refer to lengths of the duty cycles, a and b are positive numbers, and b>a; and a total duration of at least one active level of the light-emitting control signal within one frame period after one of the at least one first switch is performed is between a total duration of at least one active level of the light-emitting control signal with the duty cycle of a % within one frame period and a total duration of at least one active level of the light-emitting control signal with the duty cycle of b % within one frame period.

19. The display apparatus according to claim 18, wherein the panel brightness when the one of the at least one first switch is performed is a first brightness, and the panel brightness when the second switch is performed is a second brightness; and the display apparatus further comprises a trigger structure electrically connected to the driving structure; and the trigger structure is configured to send a first trigger instruction at a first time point to control the driving structure to perform the at least one first switch on the light-emitting control signal, and send a second trigger instruction at a second time point to control the driving structure to perform the second switch on the light-emitting control signal, wherein the first trigger instruction comprises first brightness information and first time point information, and the second trigger instruction comprises second brightness information and second time point information.

* * * * *